(12) United States Patent
Sahu et al.

(10) Patent No.: US 10,779,342 B2
(45) Date of Patent: Sep. 15, 2020

(54) LOAD BALANCE FOR DUAL INTERFACE AUTOMOTIVE WI-FI CONTROLLERS FOR P2P DEVICES

(71) Applicant: Cypress Semiconductor Corporation, San Jose, CA (US)

(72) Inventors: Swarooparani Sahu, Bangalore (IN); Vinoth Sampath, Bangalore (IN)

(73) Assignee: Cypress Semiconductor Corporation, San Jose, CA (US)

( * ) Notice: Subject to any disclaimer, the term of this patent is extended or adjusted under 35 U.S.C. 154(b) by 0 days.

(21) Appl. No.: 15/925,566

(22) Filed: Mar. 19, 2018

(65) Prior Publication Data
US 2019/0166636 A1 May 30, 2019

Related U.S. Application Data

(60) Provisional application No. 62/590,979, filed on Nov. 27, 2017.

(51) Int. Cl.
| | |
|---|---|
| *H04W 76/14* | (2018.01) |
| *H04W 88/10* | (2009.01) |
| *H04W 48/02* | (2009.01) |
| *H04W 76/18* | (2018.01) |
| *H04W 48/20* | (2009.01) |
| *H04W 88/06* | (2009.01) |
| *H04W 76/10* | (2018.01) |

(52) U.S. Cl.
CPC .......... *H04W 76/14* (2018.02); *H04W 48/02* (2013.01); *H04W 76/18* (2018.02); *H04W 88/10* (2013.01); *H04W 48/20* (2013.01)

(58) Field of Classification Search
None
See application file for complete search history.

(56) References Cited

U.S. PATENT DOCUMENTS

| | | | |
|---|---|---|---|
| 8,655,278 B2 | 2/2014 | Laroche et al. | |
| 9,066,286 B2 | 6/2015 | Buesker et al. | |
| 9,271,153 B2 | 2/2016 | Ho et al. | |
| 9,432,848 B2 | 8/2016 | Iyer et al. | |
| 9,750,022 B2 | 8/2017 | Liu et al. | |
| 2004/0255032 A1* | 12/2004 | Danieli | A63F 13/12 709/229 |

(Continued)

OTHER PUBLICATIONS

International Search Report for International Application No. PCT/US18/58868 dated Dec. 11, 2018; 4 pages.

(Continued)

*Primary Examiner* — Faruk Hamza
*Assistant Examiner* — Cassandra L Decker

(57) ABSTRACT

A method includes receiving at a wireless access point a first probe request from a first client device requesting connection with the wireless access point via a first frequency band, queueing the first client device in response to an indication that the first client device supports connection via the second frequency band, and in response to receiving at the wireless access point a second probe request from the first client device requesting connection with the wireless access point via the second frequency band, establishing a connection between the wireless access point and the first client device using the second frequency band.

19 Claims, 6 Drawing Sheets

(56) References Cited

U.S. PATENT DOCUMENTS

| | | | |
|---|---|---|---|
| 2005/0220096 A1* | 10/2005 | Friskney | H04L 12/4645 370/389 |
| 2007/0280185 A1 | 12/2007 | McFarland et al. | |
| 2009/0252097 A1* | 10/2009 | Iyer | H04L 5/0064 370/329 |
| 2012/0224569 A1* | 9/2012 | Kubota | H04W 84/20 370/338 |
| 2012/0243474 A1* | 9/2012 | Iyer | H04L 63/1466 370/328 |
| 2013/0054976 A1* | 2/2013 | Brown | G06F 21/6218 713/189 |
| 2014/0038625 A1* | 2/2014 | Palanivelu | H04W 52/0235 455/450 |
| 2015/0358800 A1 | 12/2015 | Park et al. | |
| 2015/0373636 A1 | 12/2015 | Karaca et al. | |
| 2016/0014694 A1* | 1/2016 | Patil | H04W 52/0219 370/254 |
| 2016/0050280 A1* | 2/2016 | Ong | H04L 67/141 709/201 |
| 2016/0080413 A1* | 3/2016 | Smith | H04L 63/1458 726/23 |
| 2016/0143072 A1 | 5/2016 | Kondabattini et al. | |
| 2016/0288744 A1* | 10/2016 | Rutherford | B60L 1/00 |
| 2016/0330651 A1 | 11/2016 | Amini et al. | |
| 2017/0039145 A1* | 2/2017 | Wu | G06F 12/0813 |
| 2017/0111244 A1* | 4/2017 | Strater | H04L 43/028 |
| 2017/0142725 A1* | 5/2017 | Mohaupt | H04L 61/2076 |
| 2017/0374602 A1* | 12/2017 | Gokturk | H04W 48/18 |
| 2018/0352493 A1* | 12/2018 | Strater | H04W 48/20 |

OTHER PUBLICATIONS

Written Opinion of the International Searching Authority for International Application No. PCT/US18/58868 dated Dec. 11, 2018; 9 pages.

* cited by examiner

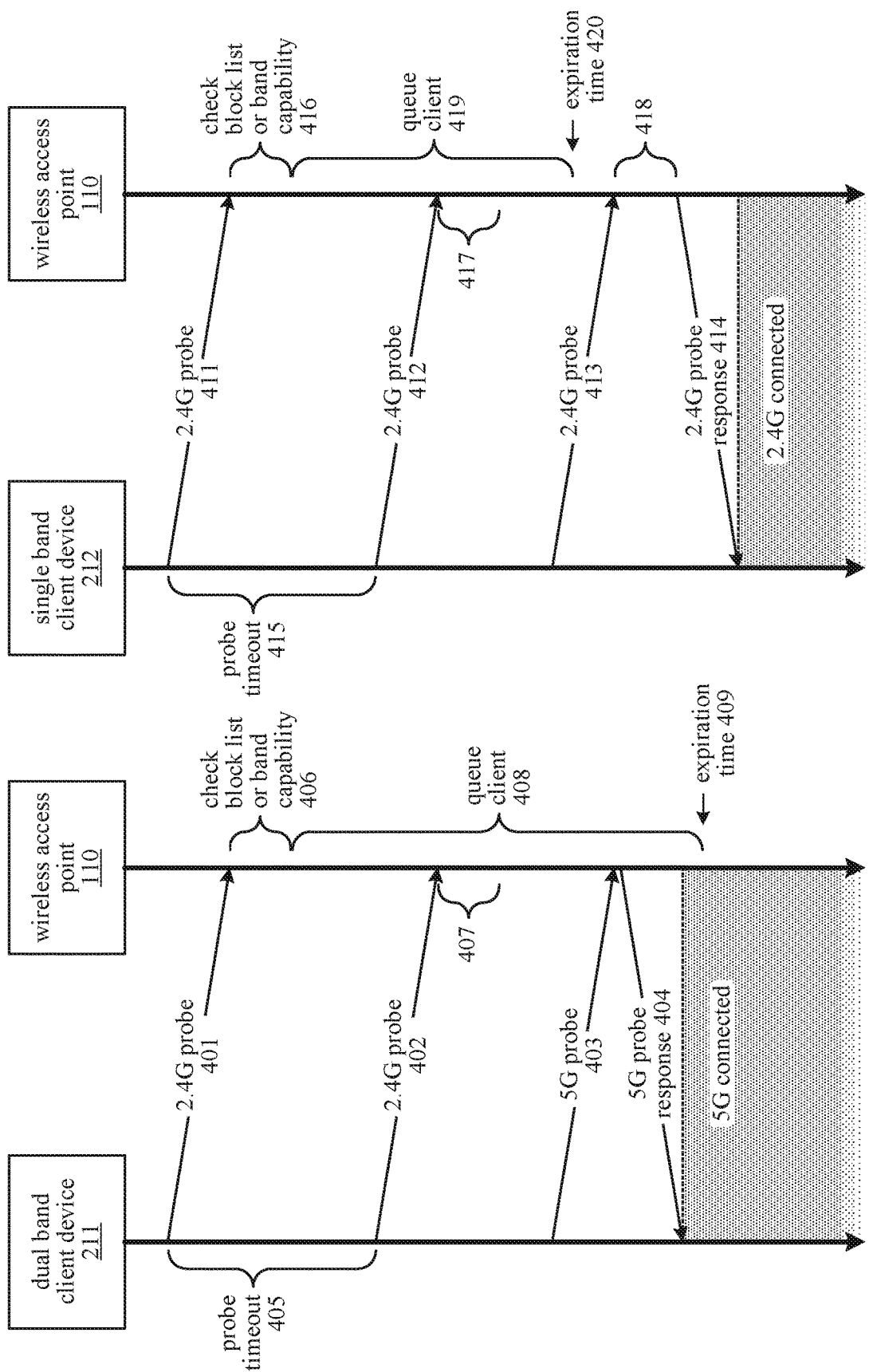

LOAD BALANCE FOR DUAL INTERFACE AUTOMOTIVE WI-FI CONTROLLERS FOR P2P DEVICES

RELATED APPLICATIONS

This application claims priority to U.S. Provisional Application No. 62/590,979, filed on Nov. 27, 2017, which is incorporated by reference herein in its entirety.

TECHNICAL FIELD

This disclosure relates to the field of wireless communications and, in particular, to the connection of dual-band client devices to a wireless access point.

BACKGROUND

Wi-Fi is a technology for connecting devices in wireless local area networks according to the Institute of Electrical and Electronics Engineers (IEEE) 802.11 specification. Devices that can that can be connected using Wi-Fi technology include personal computers, video-game consoles, phones, tablets, digital cameras, smart televisions, digital audio players, printers, and more. These and other Wi-Fi compatible devices can access the Internet by connecting to an Internet-connected wireless access point.

The frequency bands most commonly used by Wi-Fi devices are the 2.4 gigahertz (GHz) and 5 GHz radio bands. These frequency bands are industrial, scientific and medical (ISM) radio bands, which are internationally designated for use in industrial, scientific and medical fields for purposes other than telecommunications. Many devices, such as microwave ovens, baby monitors, etc. generate emissions in the 2.4 GHz band. In addition, popular communication technologies such as Bluetooth also use the 2.4 GHz band. The increasing number of Bluetooth and other devices that use or emit signals in the 2.4 GHz band can interfere with Wi-Fi signals in the same band, particularly when many such devices are being used in close proximity, such as when the devices are used in a room of a building or an interior cabin of a vehicle.

BRIEF DESCRIPTION OF THE DRAWINGS

The present disclosure is illustrated by way of example, and not by way of limitation, in the figures of the accompanying drawings.

FIGS. 4A-4D illustrate timing diagrams for establishing connections between a wireless access point and client devices, according to an embodiment.

DETAILED DESCRIPTION

Figure 1:
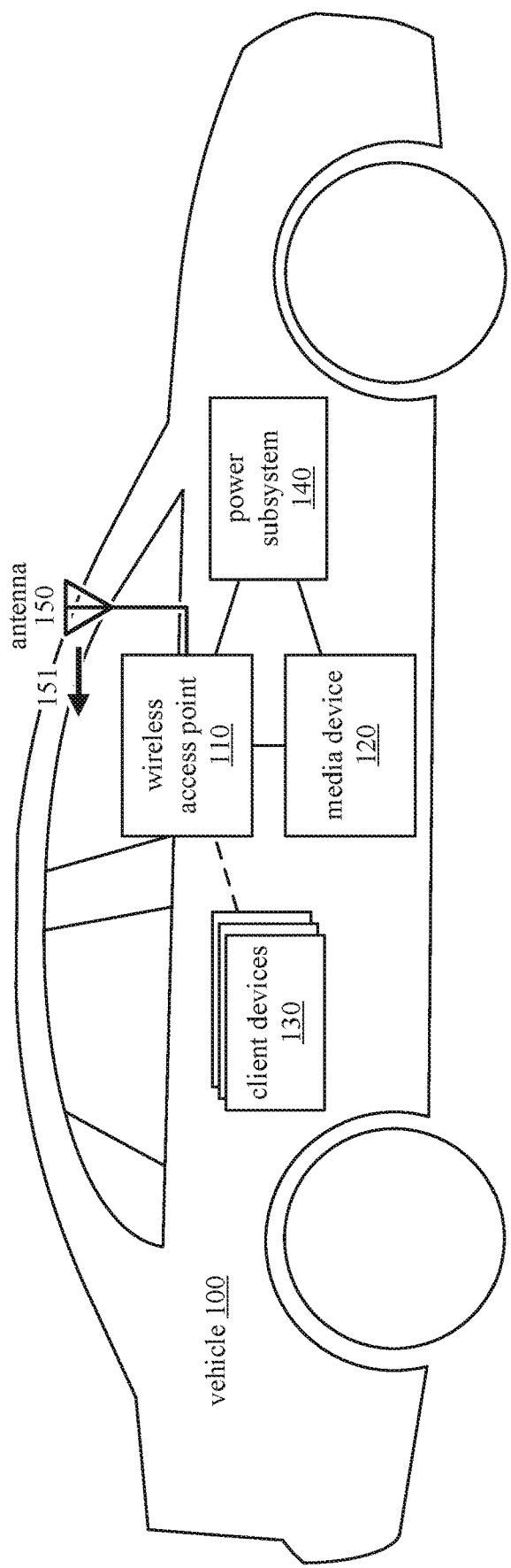
FIG. 1 is a block diagram of a wireless system in a vehicle, according to an embodiment.

The following description sets forth numerous specific details such as examples of specific systems, components, methods, and so forth, in order to provide a good understanding of several embodiments of the claimed subject matter. It will be apparent to one skilled in the art, however, that at least some embodiments may be practiced without these specific details. In other instances, well-known components or methods are not described in detail or are presented in a simple block diagram format in order to avoid unnecessarily obscuring the claimed subject matter. Thus, the specific details set forth are merely exemplary. Particular implementations may vary from these exemplary details and still be contemplated to be within the scope of the claimed subject matter.

In one embodiment, Wi-Fi technology is used to establish connections between one or more devices in an environment such as an interior of a vehicle (e.g., automobile or boat), an interior room of a building, or another living space. In particular, Wi-Fi technology can be used to establish a peer-to-peer (P2P) ad-hoc wireless network including one or more wireless devices. In such a P2P network, a wireless access point device is designated as a group owner (GO) in the network, while other devices in the P2P network are clients. The group owner, when designated by a user, is known as an Autonomous Group Owner (AGO). The wireless access point can be a soft access point (SoftAP), a mobile access point, a group owner (GO), or any other device that provides access point functionality.

In one embodiment, an access point device includes a dual-band radio that is capable of establishing connections over both of the 2.4 GHz (2.4 G) and 5 GHz (5 G) bands. The access point thus includes a 2.4 GHz AGO and a 5 GHz AGO that are both connected to the same network. Some client devices (i.e., single-band devices) are only capable of connecting to the network via the 2.4 GHz AGO (using the 2.4 GHz band); however, dual-band clients support either of the 2.4 GHz or the 5 GHz bands.

However, in many cases, a dual-band capable client connects to one of the two group owners according to its own internal logic, which can cause the dual-band client to connect using the more crowded 2.4 GHz band even if it is capable of using the less crowded 5 GHz band. In some use cases, such as automotive infotainment systems, wireless networks are often dominated by a greater number of 2.4 GHz devices, including Bluetooth devices and single-band 2.4 GHz Wi-Fi devices, than dual-band devices. In these environments, a dual-band capable client using the 2.4 GHz band could operate at a substantially lower data rate due to interference and traffic in the 2.4 GHz band, resulting in poor performance.

In one embodiment, a wireless access point device operating dual AGOs for the 2.4 GHz and 5 GHz bands steers dual-band client devices to connect via the 5 GHz interface instead of the 2.4 GHz interface. This avoids interference caused by Bluetooth devices and 2.4 GHz Wi-Fi devices, thus improving performance for the 5 GHz capable dual-band devices. However, individual dual-band capable devices are not necessarily configured to prefer the 5 GHz band, and may in fact prefer the 2.4 GHz band. In a common configuration, for example, a dual-band capable P2P device performs a P2P discovery service that begins by probing the social channels 1, 6, and 11 in the 2.4 GHz band.

Accordingly, the wireless access point device in one embodiment identifies dual-band capable devices and prevents these devices from connecting to the 2.4 GHz GO. For devices in an IEEE 802.11 compliant network using the Wi-Fi Protected Setup protocol, the group owner can determine the band capabilities of a client attempting to connect from a Wi-Fi Protected Setup Information Element (WPS IE) in a probe request that is transmitted by a client when attempting to connect to the group owner. In one embodiment, the access point device thus causes dual-band capable devices to connect using the 5 GHz band without first connecting via the 2.4 GHz band by ignoring probe requests in the 2.4 GHz band; having failed to connect using the 2.4 GHz band, the dual-band device connects in the 5 GHz band instead.

FIG. 1 illustrates an embodiment of a vehicle system that includes devices connected in a wireless network. The vehicle 100 includes a wireless access point device 110 that is connected to a media device 120, which can be a stereo head unit, infotainment unit, or other device in the vehicle 100. Each of the wireless access point 110 and the media device 120 are powered by the power subsystem 140 of the vehicle. The system also includes a number of wireless client devices 130 that are capable of connecting to the wireless access point 110 via the 2.4 GHz or 5 GHz bands, or other Wi-Fi frequency bands. In one embodiment, the wireless access point device 110 is also capable of connecting to Bluetooth devices. From the wireless access point 110, wireless radio signals are transmitted from the antenna (or set of antennas) 150. The wireless access point 110 supports beam steering, and can direct signals transmitted from the antenna 150 in a direction 151 toward the interior of the vehicle 100, where Wi-Fi client devices and Bluetooth devices are most likely to be located.

While the vehicle 100 is illustrated in FIG. 1 as a passenger automobile, the vehicle 100 in alternative embodiments may be embodied as a different type of vehicle, such as an aircraft or boat. In alternative embodiments, components of a wireless network can be located inside a room or other living space. For example, a home theater system, home automation system, etc. can include multiple wirelessly connected devices inside or near an interior or exterior living space.

Figure 2:
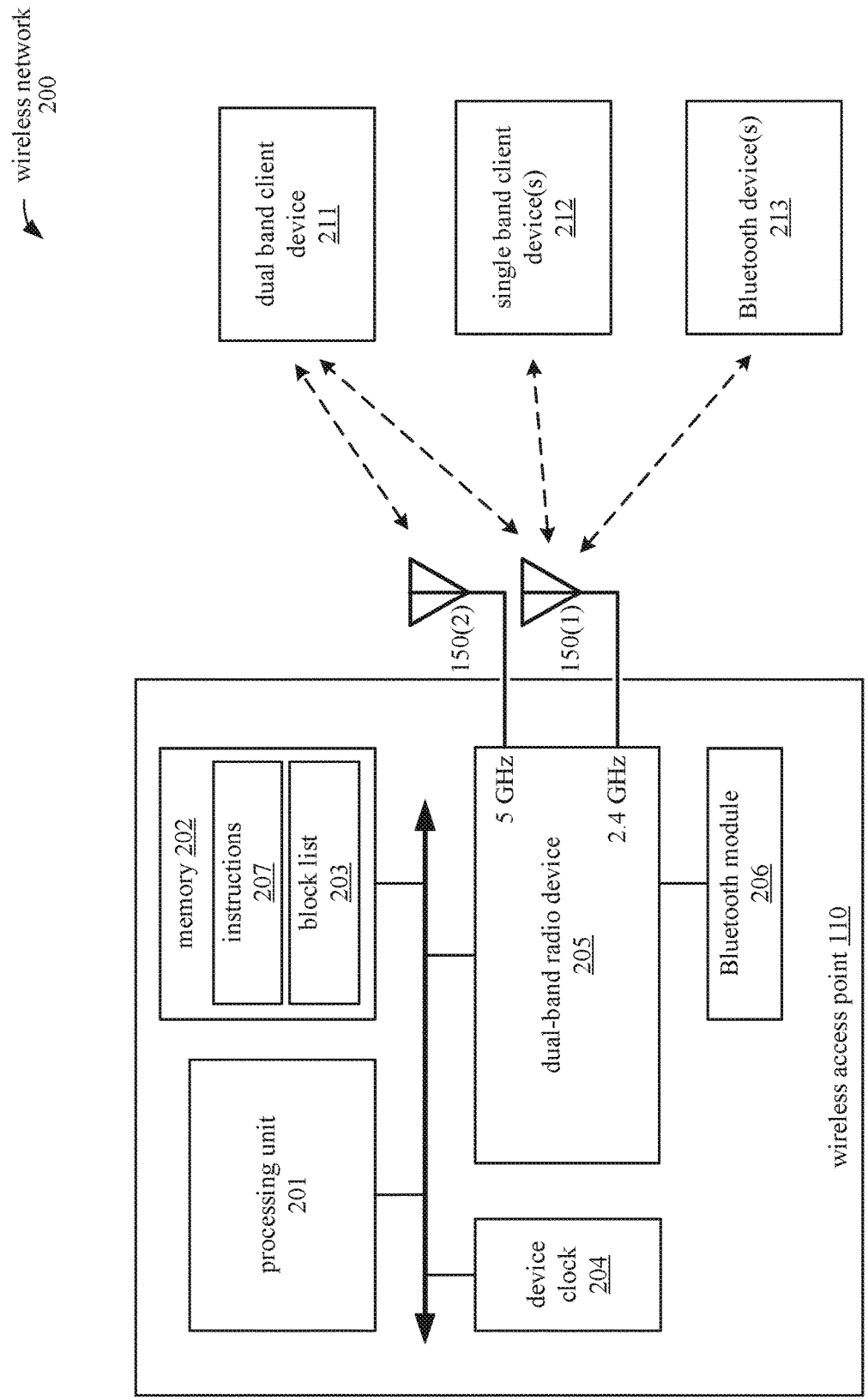
FIG. 2 illustrates a block diagram of a wireless network, according to an embodiment.

FIG. 2 illustrates an embodiment of a wireless network 200 including a wireless access point 110 that supports wireless communications over two different frequency bands with Wi-Fi client devices 211 and 212. The wireless access point 110 also includes a Bluetooth module 206 to establish and maintain one or more Bluetooth connections with one or more respective Bluetooth devices 213. The wireless access point 110 communicates with one or more single-band Wi-Fi client devices 212 via a 2.4 GHz GO transmitting signals through a first antenna 150(1), which is also shared with the Bluetooth module 206. The wireless access point 110 can also communicate with a dual-band Wi-Fi client device 211 through either the 2.4 GHz GO or a 5 GHz GO transmitting signals through a second antenna 150(2). In one embodiment, each of the 2.4 GHz GO and 5 GHz GO are single-input single-output (SISO) access points having the same service set identifier (SSID) and passcode for connection.

In one embodiment, the wireless network 200 includes one or more single-band client devices 212 and Bluetooth devices 213 that are already connected to the wireless access point 110. The single-band client devices 212 and Bluetooth devices 213 communicate with the wireless access point 110 and/or each other using the 2.4 GHz frequency band, thus creating an environment in which the 2.4 GHz band is more heavily used than the 5 GHz band. Accordingly, when a dual-band client device 211 attempts to connect wirelessly to the wireless access point 110 in this environment, the wireless access point 110 steers the dual-band client device 211 to connect using the 5 GHz band to avoid interference with and from the existing 2.4 GHz traffic.

The wireless access point 110 includes a dual-band radio device 205 in which the 2.4 GHz GO and 5 GHz GO are implemented. To connect to the wireless access point 110, the dual-band client device 211 transmits a probe request that requests a connection with the wireless access point 110 via either the 2.4 GHz or the 5 GHz frequency bands. In response to a probe request for connection via the preferred 5 GHz band, the wireless access point 110 transmits a probe response to the dual-band client device 211 to establish a wireless connection between the wireless access point 110 and the dual-band client device 211 using the 5 GHz frequency band. If the dual-band client device 211 transmits a probe request for connection using the non-preferred 2.4 GHz band, the wireless access point 110 attempts to steer the client device 211 to connect via the 5 GHz band.

In one embodiment, the processing unit 201 performs computations associated with steering the dual-band client device 211 to connect using the 5 GHz frequency band by executing instructions stored in the memory 202. The memory 202 can include volatile and/or non-volatile memory, random-access memory (RAM), read-only memory (ROM), etc. In various embodiments, the instructions 207 can be provided as software, firmware, or a combination of software and firmware.

According to the instructions 207, when a probe request for the non-preferred 2.4 GHz band is received, the processor 201 determines whether the client device 211 is capable of using the preferred 5 GHz band. The processor 201 validates and parses a WPS IE frame transmitted in the 2.4 GHz probe request. In the 'RF Bands' attribute of the WPS IE, a value of 0x01 indicates that the device is capable of using the 2.4 GHz band, 0x02 indicates that the device is capable of using the 5 GHz band, and 0x03 or 'Auto' indicates that the device can use either band. If the 'RF Bands' attribute indicates that the client device 211 is a dual-band device that is also capable of using the 5 GHz band, the processing unit 201 queues the device 211 without responding to the 2.4 GHz probe request. The device 211 is queued in a block list 203 stored in the memory 202.

While the client 211 is in the block list 203, 2.4 GHz probe requests from the client 211 are ignored until an expiration time associated with the client 211 in the block list 203 is reached. Since probe requests for the 2.4 GHz band are ignored, the client device 211 attempts to connect to the wireless access point 110 using the 5 GHz band. Accordingly, the client device 211 transmits a 5 GHz probe request that is received at the 5 GHz GO, and the wireless access point 110 transmits a probe response to establish the 5 GHz wireless connection in response to the 5 GHz probe request.

If no 5 GHz probe request is received, the processing unit 201 continues to ignore any 2.4 GHz probe requests from the client 211 while occasionally or periodically comparing the expiration time with a current time provided by device clock 204 to determine if the expiration time has been reached. After the expiration time has been reached, the wireless access point 110 stops ignoring 2.4 GHz probe requests from the client 211 and allows the client device 211 to connect using the 2.4 GHz band. This mechanism allows 2.4 GHz single-band clients to eventually connect to the wireless access point 110 even if they inaccurately assert dual-band capabilities by reporting a 'RF Bands' attribute of 'Auto'. This also allows dual-band capable clients to connect via the 2.4 GHz band if they do not attempt to connect using the 5 GHz band within a certain timeout period, as delimited by the expiration time.

In one embodiment, the above mechanism can be used in general to steer wireless connections from any non-preferred frequency band to a preferred frequency band, where these frequency bands represent different designated ranges of frequencies. While in one embodiment, the non-preferred and preferred frequency bands are the 2.4 GHz and 5 GHz bands as described above, the non-preferred and preferred frequency bands can represent different frequency ranges in other embodiments. For example, the above mechanism can be used to steer wireless connections from a non-preferred upper portion of the 5 GHz band to a preferred lower portion of the 5 GHz band, or vice versa.

In one embodiment, the components 201-207 of the wireless access point 110 reside in a single integrated circuit chip device. In an alternative embodiment, the wireless access point 110 components are located in separate integrated circuit packages on a common carrier board.

Figure 3A:
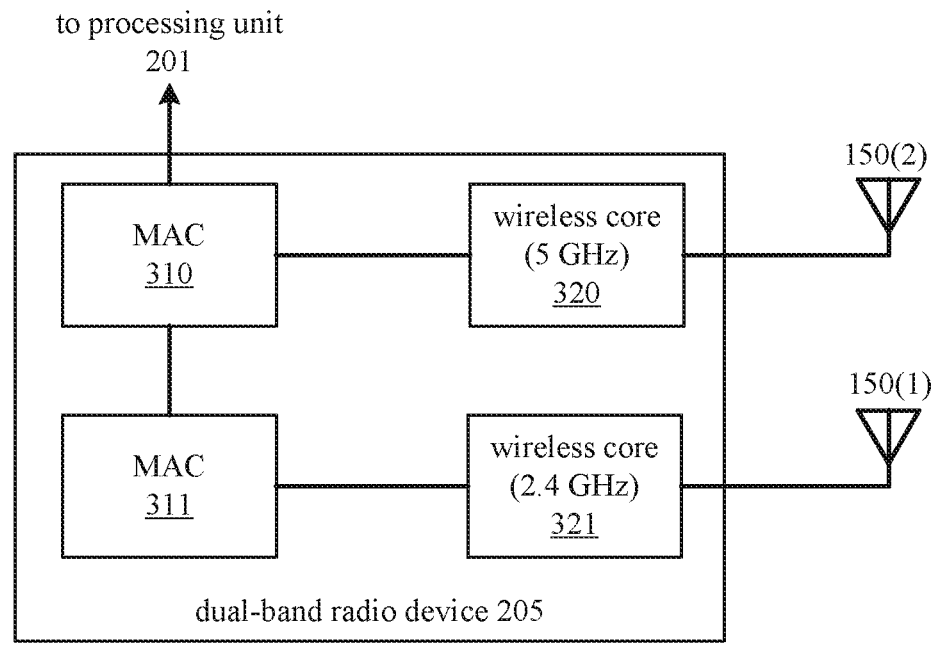
FIG. 3A illustrates a block diagram of a dual-band radio device, according to an embodiment.

FIG. 3A illustrates a block diagram of a dual-band radio device 205, according to an embodiment. The dual-band radio device 205 includes a media access controller (MAC) 311 and a wireless core 321 for implementing a 2.4 GHz GO, and a MAC 310 and wireless core 320 for implementing a 5 GHz GO. The MAC modules 310 and 311 encapsulate data into frames to be transmitted wirelessly, then forward the frames to wireless cores 320 and 321 to be converted into wireless signals and transmitted via antennas 150(2) and 150(1), respectively. In one embodiment, each of the wireless cores 320 and 321 includes radio transceiver circuitry, modulator and demodulator (modem) circuitry, and other physical layer circuit modules for performing the wireless transmission. Communications (e.g., probe requests) transmitted from client devices to the wireless access point 110 using the 2.4 GHz band are received by the wireless core 321, while communications transmitted using the 5 GHz band are received by the wireless core 320. In the dual-band radio device 205, the MAC 310 for the preferred 5 GHz band functions as a master device, while MAC 311 for the non-preferred 2.4 GHz band functions as a slave. Data provided from the processing unit 201 to the slave MAC 311 is passed to the slave MAC 311 by the master MAC 310.

Figure 3B:
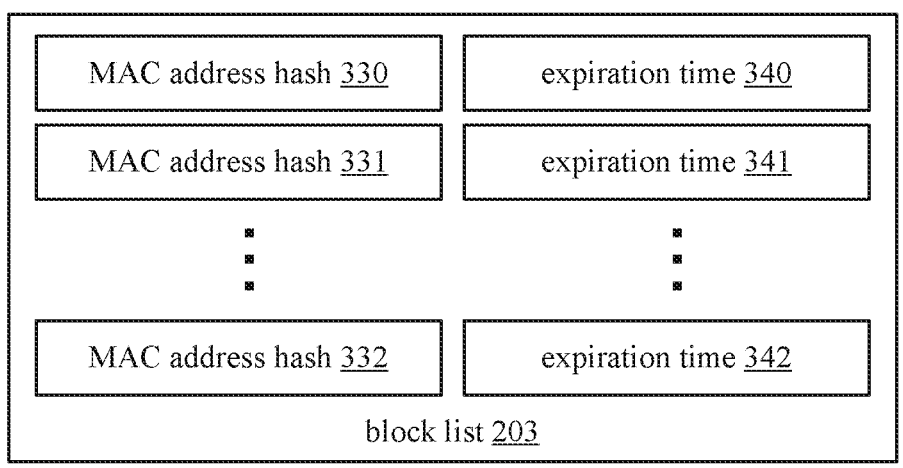
FIG. 3B illustrates a block list of wireless client devices, according to an embodiment.

FIG. 3B illustrates a block list 203, according to an embodiment. The block list 203 is stored in the memory 202 and is maintained by the processing unit 201. When a client device 211 transmits a probe request for the non-preferred 2.4 GHz frequency band and the 'RF Bands' attribute indicates the client device 211 is capable of communicating via the 5 GHz band, then the processing unit 201 queues the client device 211 in the block list (if the client device 211 is not already in the block list 203). In one embodiment, the processing unit 201 queues the client device 211 by storing the media access control (MAC) address of the client device 211 in the block list 203. In one embodiment, the block list 203 is implemented using a Bloom filter; accordingly, the MAC address of the client is hashed, and a MAC address hash (e.g., 330-332) is stored in the block list 203. Each MAC address or MAC address hash 330-332 is associated with a corresponding expiration time 340-342. In one embodiment, the expiration time is calculated by adding a predetermined time duration (e.g., 10 milliseconds) to the time at which the probe request was received.

When a subsequent probe request is received for the non-preferred 2.4 GHz band, the processing unit 201 checks the MAC address of the requesting client device against the block list 203. When the block list 203 is implemented as a Bloom filter, the MAC address of the requesting client is hashed and compared with the MAC address hash entries 330-332 in the block list 203 to determine if the client device was previously blocked. If a match is found (indicating that the client device was previously blocked) and the associated expiration time has not been exceeded by the system time, as provided by the device clock 204, then the received 2.4 GHz probe request is ignored.

Since the Bloom filter implementation of block list 203 is probabilistic, false positives can occur; that is, a client device can occasionally be identified as being on the block list 203 when it was not previously blocked (e.g., due to hash collision). In these cases, the client device will eventually be unblocked when the expiration time is reached.

For each client device represented in the block list 203, when the associated expiration time is reached, the wireless access point 110 stops ignoring probe requests for the non-preferred 2.4 GHz band. In response to receiving a probe request for the 2.4 GHz band from a client device after the client device has been unblocked (i.e., the expiration time has elapsed), the wireless access point 110 transmits a probe response in order to establish the requested wireless connection with the client using the 2.4 GHz band. If a 5 G probe request is received from a client device, the block list 203 is not checked, and the wireless access point 110 transmits a probe response to establish the requested connection in the 5 GHz band.

The client device is dequeued from the block list 203 by removing its MAC address or MAC address hash from the block list 203 after a connection has been established in either of the 2.4 GHz or 5 GHz bands. Clients are dequeued from the block list after the connection has been established so that subsequent probe requests for the 2.4 GHz band do not cause the client device to be blocked again. In one embodiment, the block list 203 is implemented using a counting Bloom filter to allow the deletion of MAC address hashes.

FIG. 4A illustrates a timing diagram for establishing a wireless connection between a dual-band client device 211 and wireless access point 110, according to an embodiment. As illustrated in FIG. 4A, the client device 211 first attempts to connect to the wireless access point 110 via the 2.4 GHz frequency band by transmitting a 2.4 GHz probe request 401 to the wireless access point 110, which is received in the wireless core 321. At time 406, upon receiving the probe request 401, the wireless access point 110 checks the block list 203 to determine whether the client device 211 is blocked. The wireless access point 110 determines that the dual-band client device 211 has not been previously blocked, and thus continues to determine whether the dual-band client device 211 is capable of connecting using the 5 GHz band by checking the 'RF Bands' attribute of the WPS IE frame transmitted with the probe request 401.

The client device 211 is a dual-band capable device; accordingly, the 'RF Bands' attribute is set to 'Auto', indicating that the dual-band client device 211 can communicate in either of the 2.4 GHz or the 5 GHz bands. In response to determining that the client device 211 is capable of communicating in the preferred 5 GHz band, the wireless access point 110 queues the client for a duration 408 by adding its MAC address or a hash of its MAC address to the block list 203, along with an expiration time 409. In one embodiment, the expiration time 409 is 10 milliseconds after the time that the 2.4 GHz probe 401 is received at the wireless access point 110.

After a probe timeout duration 405, the dual-band client device 211, having failed to receive a probe response for its initial probe request 401, transmits a subsequent probe request 402 to reattempt connecting in the 2.4 GHz band. The probe request 402 is received in the wireless core 321 and its contents are provided to the processing unit 201. The processing unit 201 in the wireless access point 110 checks the block list 203 during time 407, determines that the client 211 is queued in the block list 203, and ignores the 2.4 GHz probe request 402 accordingly.

If probe request 403 requesting to establish a connection in the 5 GHz band is received in the 5 GHz wireless core 320 of the wireless access point 110 during the time 408 when the client 211 is queued, the wireless access point 110 does not check the block list 203 and transmits a valid 5 GHz probe response 404 via the wireless core 320 that includes the details of the 5 GHz GO to establish the requested 5 GHz connection. After the client device 211 receives the probe response 404, the 5 GHz connection is established between the client device 211 and the wireless access point 110. The client device 211 is dequeued from the block list 203.

FIG. 4B illustrates a timing diagram for establishing a wireless connection between a single-band client device 212 and wireless access point 110, according to an embodiment. In one embodiment, the client device 212 represents a single-band wireless device that erroneously identifies itself as a dual-band capable device (via setting the 'RF Bands' attribute to 'Auto'); alternatively, the client device 212 can represent a dual-band capable device that continues attempting to connect via the 2.4 GHz frequency band after the expiration time 420 has elapsed, without attempting to connect using the 5 GHz frequency band.

The client device 212 transmits a 2.4 GHz probe request 411 to the wireless access point 110. The probe request 411 is received in the 2.4 GHz wireless core 321 of the wireless access point 110. During time 416, the wireless access point 110 checks its block list 203 and determines that the client device 212 has not previously been blocked. Also during time 416, the wireless access point 110 parses the WPS IE frame transmitted with the probe request 411. The 'RF Band' attribute of the WPS IE frame is set to 'Auto', inaccurately indicating that the client device 212 has dual-band communication capabilities; therefore, the wireless access point 110 queues the client device 212 for a duration 419. The processing unit 201 of the wireless access point 110 adds the MAC address or a hash of the MAC address of the client device 212 to the block list 203 and associates it with an expiration time 420.

While the client device 212 is queued, its probe timeout 415 expires and the client device 212 transmits a subsequent probe request 412 again requesting connection via the 2.4 GHz band. In response to the probe request 412, the wireless access point 110 at time 417 locates the client device 212 on the block list 203 and ignores the probe request 412.

A third 2.4 GHz probe request 413 is transmitted from the client device 212 and received at the wireless access point 110 after the expiration time 420 has elapsed. During time 418, the processing unit 201 of the wireless access point 110 checks the block list 203 and determines that the client device 212 was previously blocked and that the block has expired. Therefore, in response to the probe request 413, the wireless access point 110 transmits via the 2.4 GHz wireless core 321 a probe response 414 including details of the 2.4 GHz GO. A 2.4 GHz connection is established between the client device 212 and the wireless access point 110 after the probe response 414 is received at the client device 212. When the connection is established, the processing unit 201 dequeues the client device 212 from the block list 203 by removing its MAC address or MAC address hash from the block list 203. FIG. 4B thus illustrates a fail-safe mechanism by which a single-band client device 212 that erroneously reports its band capability (or a dual-band capable client device that does not timely transmit a 5 GHz probe request) can still connect with the wireless access point 110 using the 2.4 GHz band after the expiration time 420 has elapsed.

Figures 4C, 4D:
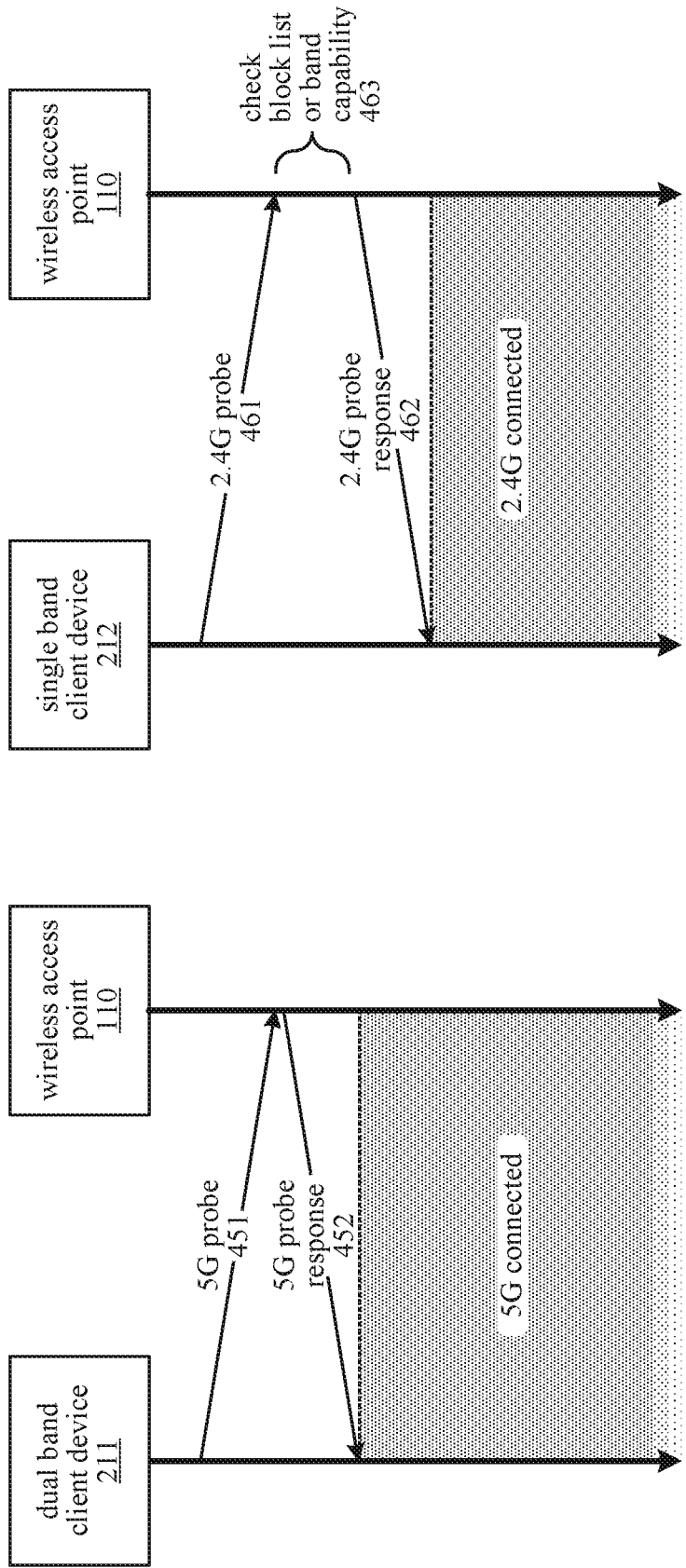

FIG. 4C illustrates a timing diagram for establishing a wireless connection between a dual-band client device 211 and wireless access point 110, according to an embodiment. In particular, FIG. 4C illustrates the case in which the dual-band client device 211 prefers the 5 GHz band and transmits a 5 GHz probe request 451 without previously transmitting any 2.4 GHz probe request. In this case, the wireless access point 110 receives the probe request 451 in its preferred 5 GHz wireless core 320 and responds by transmitting a 5 GHz probe response 452 to the client device 211. After the client device 211 receives the probe response 452, the requested connection is established between the client device 211 and the wireless access point 110 in the 5 GHz frequency band. In one embodiment, during this process, the wireless access point 110 does not need to check the 'RF Bands' attribute or the block list.

In one embodiment, the dual-band client device 211 identifies either the 2.4 GHz GO or the 5 GHz GO as transmitting a stronger signal and attempts connecting to the GO having the stronger signal first. Accordingly, the wireless access point 110 induces the client device 211 configured in this way to send the first probe request 451 to the 5 GHz GO by increasing the transmission power (e.g., of the beacon and probe responses) in the 5 GHz band to a level higher than the transmission power in the 2.4 GHz band. In one embodiment the transmission power in the 5 GHz band is increased by 2-3 decibel-milliwatts (dBm) over the transmission power of the 2.4 GHz band. In one embodiment, the increase in power in the 5 GHz band can be a directional power increase achieved by beamforming. For example, with reference to FIG. 1, the signal can be beamformed to focus transmission power in the 5 GHz band in the direction 151 toward the interior of a vehicle cabin where client devices 130 are most likely to be located. In other embodiments, the client device 211 may prefer connecting via the 5 GHz band based on its own determination that better performance can be obtained by using the 5 GHz band, its own predetermined configuration, a command from a user to connect to the 5 GHz band, etc.

FIG. 4D illustrates a timing diagram for establishing a wireless connection between a single-band client device 212 and wireless access point 110, according to an embodiment. In particular, FIG. 4D illustrates the case in which the single-band client device 212 is capable of communicating only on the 2.4 GHz band, and correctly indicates its single-band capability in the 'RF Bands' attribute. In this case, the wireless access point 110 receives the probe request 461 in the 2.4 GHz wireless core 321. At time 463, the wireless access point 110 checks the block list 203 and determines that the client device 212 has not been previously blocked. Also at time 463, the wireless access point 110 checks the 'RF Bands' attribute transmitted in the WPS IE frame in the probe request 461. The 'RF Bands' attribute is correctly set to 0x01, indicating that the client device 212 can only communicate in the 2.4 GHz band. Accordingly, the wireless access point 110 responds by transmitting a 2.4 GHz probe response 462 to the client device 211. After the client device 212 receives the probe response 462, the requested connection is established between the client device 212 and the wireless access point 110 in the 2.4 GHz frequency band.

Figure 5:
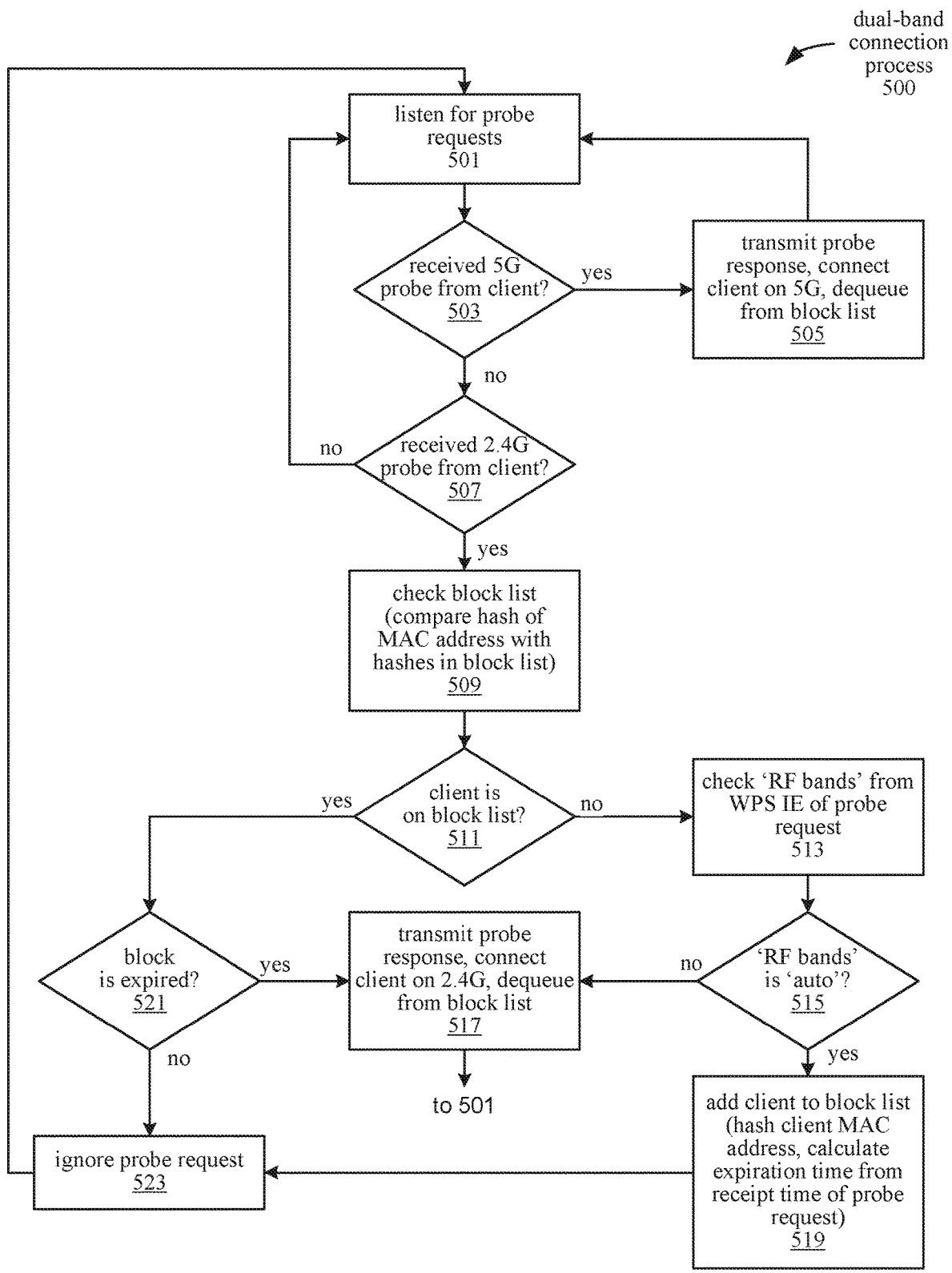
FIG. 5 illustrates a flow diagram of process for establishing a connection between a dual-band wireless access point and a client device, according to an embodiment.

FIG. 5 illustrates a process 500 for connecting clients to a dual-band capable wireless access point 110, according to an embodiment. The operations of process 500 are performed by components of the wireless network 200. During the process 500, the wireless access point 110 maintains one or more Bluetooth connections between the wireless access point 110 and one or respective Bluetooth devices 213, and further maintains Wi-Fi connections for one or more client devices 212. The Bluetooth devices 213 and client devices 212 operate in the 2.4 GHz frequency band, thus increasing the amount of traffic and potential interference in this band.

In one embodiment, the process 500 is performed in accord with FIG. 4A to connect a dual-band client device 211 with the wireless access point 110 using the preferred 5 GHz frequency band, even when the client device 211 initially requests connection using the non-preferred 2.4 GHz band.

At block 501, both of the 2.4 GHz GO and the 5 GHz GO of the wireless access point 110 listen for probe requests in their respective frequency bands. The client device 211 transmits an initial probe request 401 requesting a connection with the wireless access point 110 in the 2.4 GHz frequency band. At block 503, the wireless access point 110 has not received a probe request in the 5 GHz wireless core 320; accordingly, the process 500 continues at block 507. At block 507, the wireless access point 110 receives the probe request 401 in the 2.4 GHz wireless core 321, (e.g., probe request 401); therefore, the process 500 continues at block 509.

At block 509, the processing unit 201 checks the block list 203 (e.g., at time period 406) to determine if the client device 211 has been previously blocked. At block 511, the client device 211 is not in the block list 203; therefore, the process 500 continues at block 513. At block 513, the processing unit 201 checks the 'RF Bands' attribute in the WPS IE frame transmitted in the probe request 401. At block 515, if the 'RF Bands' attribute is 0x03 (i.e., 'Auto'), this indicates that the client device 211 is a dual-band device that supports connections using the 5 Ghz frequency band. The 'RF Bands' attribute for the client device 211 is 'Auto'; accordingly, the process 500 continues at block 519.

At block 519, the processing unit 201 queues the client device 211 by adding a MAC address or a hash of the MAC address (e.g., for a Bloom filter implementation) of the client device 211 to the block list 203. The processing unit 201 also calculates an expiration time 409 for the block by adding a predetermined time (e.g., 10 milliseconds) to the time at which the probe request 401 was received. The client device 211 is thus queued for a time duration 408, which is terminated at the expiration time 409. At block 523, the 2.4 GHz probe request 401 for the blocked client device 211 is ignored accordingly. From block 523, the process 500 returns to block 501 and continues to listen for incoming probe requests at the 2.4 GHz GO and 5 GHz GO.

If another 2.4 GHz probe request 402 is received before the expiration time 409, then at block 511, the processing unit 201 determines during time 407 that the client device 211 is represented in the block list 203 and, continuing to block 521, determines that the blocking of client device 211 has not yet expired. Accordingly, the 2.4 GHz probe request 402 is ignored at block 523, as are any other 2.4 GHz probe requests received from the client device 211 before the expiration time 409 elapses. From block 523, the process 500 returns to block 501 and continues to listen for probe requests.

However, if the client device 211 transmits a probe request 403 for the preferred 5 GHz band prior to the expiration time 409, then the process 500 continues from block 503 to block 505. At block 505, the wireless access point 110 establishes the requested 5 GHz connection with the client device 211 by, in response to the probe request 403, transmitting a probe response 404 from the wireless access point 110 to the client device 211. The 5 GHz connection is established after the client device 211 receives the probe response, which includes details of the 5 GHz GO. At this point, the client device 211 is dequeued from the block list 203 in response to successfully establishing the connection. The process 500 returns to block 501 to continue listening for probe requests from other client devices.

In one embodiment, the process 500 is performed in accord with FIG. 4B to connect a single-band client device 212 with the wireless access point 110 using the preferred 2.4 GHz frequency band, even if the client device 212 erroneously reports dual-band capability or otherwise fails to request connection using the 5 GHz band.

At block 501, the wireless access point 110 listens for probe requests on the 2.4 GHz and 5 GHz bands. When the client device 212 transmits a probe request 411 in the 2.4 GHz band, the process 500 continues from block 503 to block 507, and from block 507 continues to block 509. At block 509, the processing unit 201 at time 416 checks the block list 203 and, since the client device 212 has not yet been placed on the block list 203, proceeds from block 511 to block 513 to check the 'RF Bands' attribute in the WPS IE of the probe request 411.

At block 515, if the 'RF Bands' attribute is 'Auto', the process 500 continues at block 519. At block 519, the processing unit 201 adds the client device 212 to the block list 203 by recording a MAC address or a hash of the MAC address of the client device 212 in the block list 203, and associating it with an expiration time 418. The client device 212 is thus queued for a time duration 419, which is terminated at the expiration time 420. At block 523, the probe request 411 is ignored. Subsequent probe requests (e.g., 412) received by the wireless access point 110 before the expiration time 420 has elapsed are also ignored through the operation of blocks 507, 509, 511, 521, and 523.

When a 2.4 GHz probe request 413 is transmitted by the client device 212 that is received by the wireless access point 110 after the expiration time 420 has elapsed, then at block 521, the processor 201 determines that the current time as provided by the device clock 204 exceeds the expiration time 420, indicating that the expiration time 420 has elapsed. From block 521, the process 500 continues at block 517. At block 517, the wireless access point 110 responds to the probe request 413 by transmitting a probe response 414 including the details of the 2.4 GHz GO. The 2.4 GHz connection is established after the client device 212 receives the probe response 414. Thus, when the current time exceeds the expiration time before any probe request is received for the 5 GHz band, the wireless access point 110 establishes a connection with the client device 212 using the non-preferred 2.4 GHz band. In response to successfully establishing the 2.4 GHz connection, the client device 212 is dequeued from the block list 203, and the process 500 returns to block 501 to listen for probe requests from other client devices.

In one embodiment, the process 500 is performed in accord with FIG. 4C to connect a dual-band client device 211 with the wireless access point 110 using the preferred 5 GHz frequency band when the client device 211 initially requests connection using the preferred 5 GHz band. In one embodiment, the client device 211 initially attempts to connect using the 5 GHz band based on determining that signals (e.g., beacon, probe response, etc.) transmitted in the 5 GHz band has a higher transmission power than signals transmitted in the 2.4 GHz band by the wireless access point 110.

In one embodiment, the transmission power in the 5 GHz band may be due to a deliberate increase in overall transmission power for the 5 GHz band, or due to beamforming of the 5 GHz signal to increase the transmission power in a particular direction (e.g., toward the client device 211. In one embodiment, the increase in transmission power for the preferred 5 GHz band is used in conjunction with the queueing mechanism for steering dual-band client devices to the 5 GHz band, since not all dual-band client devices may be configured to prefer the frequency band having the stronger signal.

At block 501, the wireless access point 110 listens for probe requests in the 2.4 GHz and 5 GHz bands. The client device 211 initially transmits a probe request 451 requesting a connection using the preferred 5 GHz band. Accordingly, the process 500 continues from block 503 to block 505. At block 505, the wireless access point 110 establishes the requested 5 GHz connection with the client device 211 by, in response to the probe request 403, transmitting a probe response 452 from the wireless access point 110 to the client device 211. The 5 GHz connection is established after the client device 211 receives the probe response, which includes details of the 5 GHz GO. At this point, the client device 211 is dequeued from the block list 203 in response to successfully establishing the connection. The process 500 returns to block 501 to continue listening for probe requests from other client devices.

In one embodiment, the process 500 is performed in accord with FIG. 4D to connect a single-band client device 212 with the wireless access point 110 using the preferred 2.4 GHz frequency band when the client device 211 accurately reports its single-band capabilities. At block 501, the wireless access point 110 listens for probe requests in the 2.4 GHz and 5 GHz bands. The client device 211 initially transmits a probe request 461 requesting a connection using the 2.4 GHz band. Accordingly, the process 500 continues from block 503 to block 507, and from block 507 to block 509. At block 509, the processing unit 201 at time 463 checks the block list 203 and, since the client device 212 is not in the block list 203, proceeds from block 511 to block 513 to check the 'RF Bands' attribute in the WPS IE of the probe request 461. In this case, the 'RF Bands' attribute is 0x01, indicating that the client device 212 is only capable of communicating using the 2.4 GHz band. Accordingly, the process 500 continues from block 515 to block 517.

At block 517, the wireless access point 110 responds to the probe request 461 by transmitting a probe response 462 including the details of the 2.4 GHz GO. The 2.4 GHz connection is established after the client device 212 receives the probe response 462. The process 500 returns to block 501 to continue listening for probe requests from other client devices.

In one embodiment, the dual-band connection process 500 is repeated so that the wireless access point 110 continues to listen for probe requests in both of the 2.4 GHz and 5 GHz frequency bands, and steer 5 GHz band capable devices to connect using the 5 GHz band. The process 500 allows even client devices that inaccurately report their band capabilities or otherwise fail to timely transmit a 5 GHz probe request to connect to the 2.4 GHz band. Thus, by the operation of process 500, a greater proportion of 5 GHz capable client devices connect using the 5 GHz band, thus reducing congestion in the 2.4 GHz band and increasing speed for the 5 GHz connected devices.

In the foregoing embodiments, various modifications can be made; for example, signals described as being asserted with a high voltage may instead be asserted with a low voltage, or specified components can be replaced with other components having similar functionality. As described herein, conductive electrodes that are "electrically connected" or "electrically coupled" may be coupled such that a relatively low resistance conductive path exists between the conductive electrodes. Quantities, dimensions, or other values described as "substantially" equal may be nominally equal but need not be exactly equal (with variations due to manufacturing tolerances, environmental conditions, quantization or rounding error, and/or other factors), or may be sufficiently close to equal for achieving an intended effect or benefit.

Embodiments described herein include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the claimed subject matter has been described with reference to specific exemplary embodiments thereof. It will, however, be evident that various modifications and changes may be made thereto without departing from the broader scope of the invention as set forth in the appended claims. The specification and drawings are, accordingly, to be regarded in an illustrative sense rather than a restrictive sense.

What is claimed is:

1. A method, comprising:
   receiving at a wireless access point a first probe request from a first client device requesting connection with the wireless access point via a first frequency band;
   in response to determining that the first client device is absent from a block list for the first frequency band, detecting an indication that the first client device supports connection via a second frequency band;
   queueing the first client device by adding the first client device to the block list in response to the indication, wherein the block list associates the first client device with a first expiration time and is implemented as a probabilistic filter;
   preventing the first client device from connecting to the wireless access point via the first frequency band in response to determining that the first expiration time has not elapsed; and
   in response to receiving at the wireless access point a second probe request from the first client device requesting connection with the wireless access point via the second frequency band, establishing a connection between the wireless access point and the first client device using the second frequency band; and
   dequeueing the first client device from the block list for the first frequency band in response to establishing the connection between the wireless access point and the first client device using the second frequency band.

2. The method of claim 1, wherein queueing the first client device further comprises, adding a media access control (MAC) address of the first client device to the block list by storing a hash of the MAC address.

3. The method of claim 1, further comprising in response to determining that the first client device supports connection via the second frequency band, associating the first client device with the first expiration time in the block list, wherein the second probe request is received at the wireless access point prior to the first expiration time.

4. The method of claim 1, further comprising:
   receiving at the wireless access point a third probe request from a second client device requesting connection with the wireless access point via the first frequency band; and
   in response to an indication that the second client device supports connection via the second frequency band,
      associating the second client device with a second expiration time, and
      in response to a fourth probe request received after the second expiration time requesting connection with the wireless access point via the first frequency band, establishing a connection with the second client device via the first frequency band.

5. The method of claim 1, wherein establishing the connection using the second frequency band comprises, in response to the second probe request, transmitting a probe response from the wireless access point to the first client device.

6. The method of claim 1, wherein the indication comprises a radio frequency (RF) band attribute in a Wi-Fi Protected Setup Information Element (WPS IE) frame transmitted in the first probe request.

7. The method of claim 1, wherein a transmission power of the second frequency band is greater than a transmission power of the first frequency band.

8. The method of claim 7, further comprising increasing the transmission power of the second frequency band by beamforming signals transmitted in the second frequency band toward the first client device.

9. The method of claim 1, wherein the first frequency band is a 2.4 GHz frequency band and the second frequency band is a 5 GHz frequency band.

10. The method of claim 1, further comprising maintaining one or more Bluetooth connections between the wireless access point and one or more respective Bluetooth devices prior to receiving the first probe request.

11. A wireless device, comprising:
    a first wireless core for a first frequency band, configured to receive a first probe request from a first client device requesting connection with the wireless device via the first frequency band;
    a processing unit configured to:
       in response to determining that the first client device is absent from a block list for the first frequency band, detect an indication that the first client device supports connection via a second frequency band,
       queue the first client device in the block list in response to the indication, wherein the block list associates the first client device with a first expiration time and is implemented using a probabilistic filter, and
       prevent the first client device from connecting to the wireless access point via the first frequency band in response to determining that the first expiration time has not elapsed; and
    a second wireless core for a second frequency band, configured to:
       receive a second probe request from the first client device requesting connection with the wireless device via the second frequency band,
       in response to receiving the second probe request, establish a connection between the wireless access point and the first client device using the second frequency band,
       wherein the processing unit is configured to d queue the first client device from the block list for the first frequency band in response to establishing the connection between the wireless access point and the first client device using the second frequency band.

12. The wireless device of claim 11, wherein the block list is coupled with the processing unit, and wherein the processing unit is further configured to:
    queue the first client device by adding a media access control (MAC) address of the first client device to the block list; and
    dequeue the first client device by removing the MAC address from the block list.

13. The wireless device of claim 11, wherein the block list is coupled with the processing unit, wherein the processing unit is further configured to, in response to determining that the first client device supports connection via the second frequency band, associate the first client device with the first expiration time in the block list, and wherein the second probe request is received at the wireless access point prior to the first expiration time.

14. The wireless device of claim 11, wherein:
    the first wireless core is further configured to receive a third probe request from a second client device requesting connection with the wireless access point via the first frequency band;
    the processing unit is further configured to, in response to an indication that the second client device supports connection via the second frequency band, associate the second client device with a second expiration time; and the first wireless core is further configured to, in response to a fourth probe request received after the second expiration time requesting connection with the wireless access point via the first frequency band, establishing a connection with the second client device via the first frequency band.

15. The wireless device of claim 11, wherein a transmission power of the second wireless core is greater than a transmission power of the first wireless core.

16. The wireless device of claim 11, further comprising a Bluetooth transceiver coupled with the processing unit and configured to maintain one or more Bluetooth connections between the wireless access point and one or more respective Bluetooth devices prior to receiving the first probe request, wherein the first frequency band is a 2.4 GHz frequency band and the second frequency band is a 5 GHz frequency band.

17. A system, comprising:
a media device; and
a wireless access point coupled with the media device, wherein the wireless access point comprises:
   a dual-band radio configured to:
      receive a first probe request from a first client device requesting connection with the wireless access point via the first frequency band,
      receive a second probe request from the first client device requesting connection with the wireless access point via a second frequency band, and
      in response to receiving the second probe request, establish a connection between the wireless access point and the first client device using the second frequency band, and
   a processing unit configured to
      in response to determining that the first client device is absent from a block list for the first frequency band, detect an indication that the first client device supports connection via the second frequency band,
      queue the first client device in the block list in response to the indication, wherein the block list associates the first client device with a first expiration time and is implemented using a probabilistic filter,
      prevent the first client device from connecting to the wireless access point via the first frequency band in response to determining that the first expiration time has not elapsed, and
      dequeue the first client device from the block list for the first frequency band in response to establishing the connection between the wireless access point and the first client device using the second frequency band.

18. The system of claim 17, further comprising a vehicle, wherein the media device and the wireless access point are powered by a power subsystem of the vehicle.

19. The system of claim 17, further comprising a plurality of client devices including the first client device, wherein each of the plurality of client devices is wirelessly coupled to the wireless access point, and wherein the plurality of client devices includes one or more of a single-band Wi-Fi device, a dual-band Wi-Fi device, and a Bluetooth device.

* * * * *